US009485207B2

(12) United States Patent
McClard et al.

(10) Patent No.: US 9,485,207 B2
(45) Date of Patent: Nov. 1, 2016

(54) PROCESSING OF MESSAGES USING THEME AND MODALITY CRITERIA

(71) Applicant: INTEL CORPORATION, Santa Clara, CA (US)

(72) Inventors: Anne P. McClard, Portland, OR (US); John C. Neumann, Portland, OR (US); Aaren B. Esplin, Portland, OR (US); Anna-Marie Mansour, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 14/127,946

(22) PCT Filed: Oct. 30, 2013

(86) PCT No.: PCT/US2013/067544
§ 371 (c)(1),
(2) Date: Dec. 19, 2013

(87) PCT Pub. No.: WO2015/065383
PCT Pub. Date: May 7, 2015

(65) Prior Publication Data
US 2015/0120845 A1    Apr. 30, 2015

(51) Int. Cl.
*G06Q 50/30* (2012.01)
*H04L 12/58* (2006.01)

(52) U.S. Cl.
CPC .................. *H04L 51/24* (2013.01)

(58) Field of Classification Search
CPC .................................. H04L 51/24
See application file for complete search history.

(56) References Cited

U.S. PATENT DOCUMENTS 5,796,394 A * 8/1998 Wicks .................. H04L 12/58
                                                        709/206
6,505,249 B1 * 1/2003 Rehkopf ................. H04L 29/06
                                                        702/182

(Continued)

FOREIGN PATENT DOCUMENTS

JP        2001-022655 A      1/2001

OTHER PUBLICATIONS

International Search Report and Written Opinion mailed Jul. 17, 2014 for International Application No. PCT/US2013/067544, 12 pages.

(Continued)

*Primary Examiner* — Philip Chea
*Assistant Examiner* — Wuji Chen
(74) *Attorney, Agent, or Firm* — Schwabe, Williamson & Wyatt, P.C.

(57) ABSTRACT

Embodiments related to a message processing system are disclosed herein. In some embodiments, a computing system may include receiver logic to receive a message addressed to a user; analysis logic to determine whether a message collection, including the received message, has a common theme (e.g., a common sender or common content); modality logic to identify a messaging modality associated with each of the messages in the message collection; criteria logic to determine whether the message collection satisfies modality criteria (e.g., the messages represent at least two different messaging modalities); and notification logic to provide a notification of the message collection in response to determining that the message collection has a common theme and satisfies the modality criteria. Other embodiments may be disclosed and/or claimed.

18 Claims, 4 Drawing Sheets

(56) References Cited

U.S. PATENT DOCUMENTS

| | | | | |
|---|---|---|---|---|
| 6,513,024 B1* | 1/2003 | Li | G06N 99/005 | 706/13 |
| 6,668,340 B1* | 12/2003 | Baker | G06F 11/3688 | 714/26 |
| 8,306,831 B2 | 11/2012 | Eisenberger et al. | | |
| 8,924,352 B1* | 12/2014 | Andruss | G06F 11/1461 | 707/640 |
| 2002/0138443 A1* | 9/2002 | Schran | G06Q 20/382 | 705/64 |
| 2004/0044992 A1* | 3/2004 | Muller | G06F 11/3684 | 717/124 |
| 2004/0044993 A1* | 3/2004 | Muller | G06F 11/3684 | 717/124 |
| 2004/0128651 A1* | 7/2004 | Lau | G06F 11/3664 | 717/124 |
| 2005/0015641 A1* | 1/2005 | Alur | G06F 11/1458 | 714/2 |
| 2005/0038863 A1* | 2/2005 | Onyon | G06Q 10/107 | 709/207 |
| 2005/0055416 A1* | 3/2005 | Heikes | G06Q 10/107 | 709/207 |
| 2006/0168043 A1* | 7/2006 | Eisenberger | G06F 19/326 | 709/206 |
| 2007/0067587 A1* | 3/2007 | Rossi | G06F 11/1461 | 711/162 |
| 2007/0143827 A1* | 6/2007 | Nicodemus | G06F 21/6218 | 726/2 |
| 2008/0059610 A1* | 3/2008 | Lin | G06F 9/5061 | 709/220 |
| 2008/0086719 A1* | 4/2008 | Clemenceau | G06F 9/44505 | 717/121 |
| 2008/0183309 A1* | 7/2008 | Beers | G06F 9/4411 | 700/17 |
| 2009/0030933 A1* | 1/2009 | Brezina | H04M 15/00 | |
| 2010/0146514 A1* | 6/2010 | Alexander | G06F 11/3688 | 718/104 |
| 2011/0066708 A1* | 3/2011 | Schran | G06Q 20/382 | 709/221 |
| 2012/0143948 A1* | 6/2012 | Archambault | H04L 12/588 | 709/204 |
| 2013/0019242 A1* | 1/2013 | Chen | H04L 41/145 | 718/1 |
| 2013/0035909 A1* | 2/2013 | Douady | 714/37 | |
| 2014/0279922 A1* | 9/2014 | Kottomtharayil | G06F 9/505 | 703/2 |
| 2014/0295807 A1* | 10/2014 | Li | H04W 4/16 | 455/414.1 |

OTHER PUBLICATIONS

International Preliminary Report on Patentability mailed May 12, 2016 for International Application No. PCT/US2013/067544, 8 pages.

* cited by examiner

| MSG ID | TIME RECEIVED | TIME SENT | SENDER | SENDER ID | MODALITY | SUBJECT | SENDER WINDOW | CONTENT WINDOW | THEMED COLLECTIONS | NOTIFICATION |
|---|---|---|---|---|---|---|---|---|---|---|
| 56 | 13:39:41PT | 13:38:22PT | Ellen Williams | 125 | soc_med | You're invited: Carl's Birthday... | {} | {} | {content=carl_birthday} | {} |
| 57 | 13:41:34PT | 13:41:02PT | Fran Jones | {} | e-mail | Shipment Confirmation... | {56} | {56} | {} | {} |
| 58 | 13:42:31PT | 13:42:02PT | Smith, David | 673 | voice | {} | {56, 57} | {56, 57} | {sender=david, content=david} | {} |
| 59 | 13:42:33PT | 13:42:05PT | David Smith | 673 | text | Where are you? | {56, 57, 58} | {56, 57, 58} | {sender=david, content=david} | {sender=david} |
| 60 | 13:43:07PT | 13:43:04PT | Greg Brown | 332 | calendar | Carl's Party: Meet at the... | {57, 58, 59} | {56, 57, 58, 59} | {content=carl_birthday} | {} |
| 61 | 13:44:51PT | 13:44:49PT | Bob | 549 | e-mail | Two items | {58, 59, 60} | {56, 57, 58, 59, 60} | {content=carl_birthday, content=david} | {content=david} |
| 62 | 13:47:17PT | 13:47:14PT | Wilson, Lisa | {} | e-mail | Re: You're Invited: Carl's... | {61} | {56, 57, 58, 59, 60, 61} | {content=carl_birthday} | {} |
| 63 | 13:51:12PT | 13:51:01PT | Mary Jackson | 228 | chat | Re: You're Invited: Carl's... | {} | {57, 58, 59, 60, 61, 62} | {content=carl_birthday} | {content=carl_birthday} |

FIG. 3

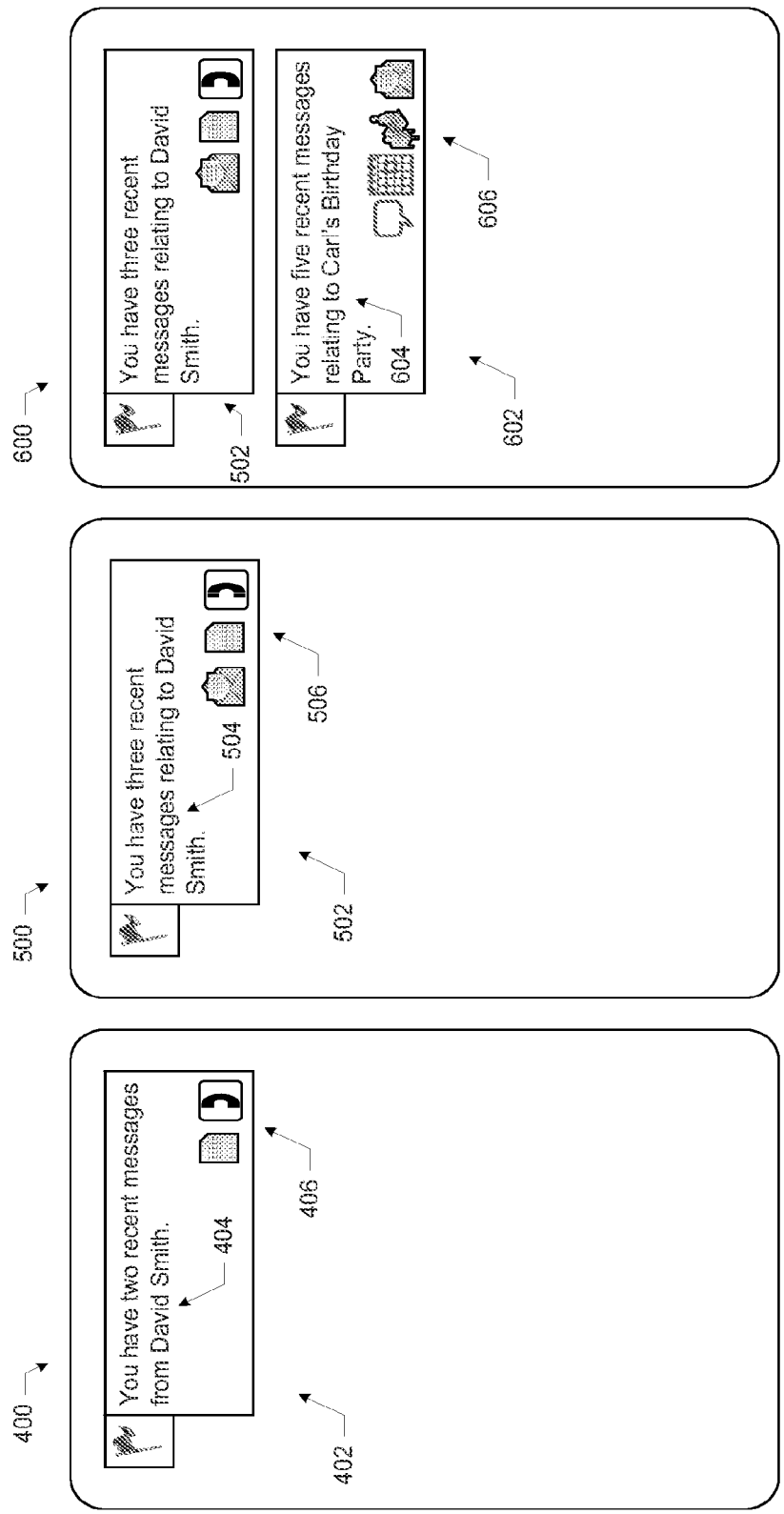

PROCESSING OF MESSAGES USING THEME AND MODALITY CRITERIA

CROSS REFERENCE TO RELATED APPLICATION

The present application is a national phase entry under 35 U.S.C. §371 of International Application No. PCT/US2013/067544, filed Oct. 30, 2013, entitled "PROCESSING OF MESSAGES USING THEME AND MODALITY CRITERIA," which designated, among the various States, the United States of America, and which is hereby incorporated by reference.

TECHNICAL FIELD

The present disclosure relates generally to the field of computing systems, and more particularly, to processing of messages using theme and modality criteria.

BACKGROUND

Messaging systems, such as telephone, e-mail, chat, text, and social media messaging systems, allow users to receive information from other users, businesses and organizations in a variety of different formats. Many individuals use multiple such messaging systems, and may receive tens, hundreds or thousands of messages each day. Such individuals may find it distracting to be constantly pinged by one or another messaging system, and may be overwhelmed by the volume and variety of messages received within and among such messaging systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 depicts an illustrative memory structure for storing message data to enable message collection notification, in accordance with various embodiments.

FIGS. 4-6 illustrate example displays for notifying a user of messages, in accordance with various embodiments.

DETAILED DESCRIPTION

Figure 2:
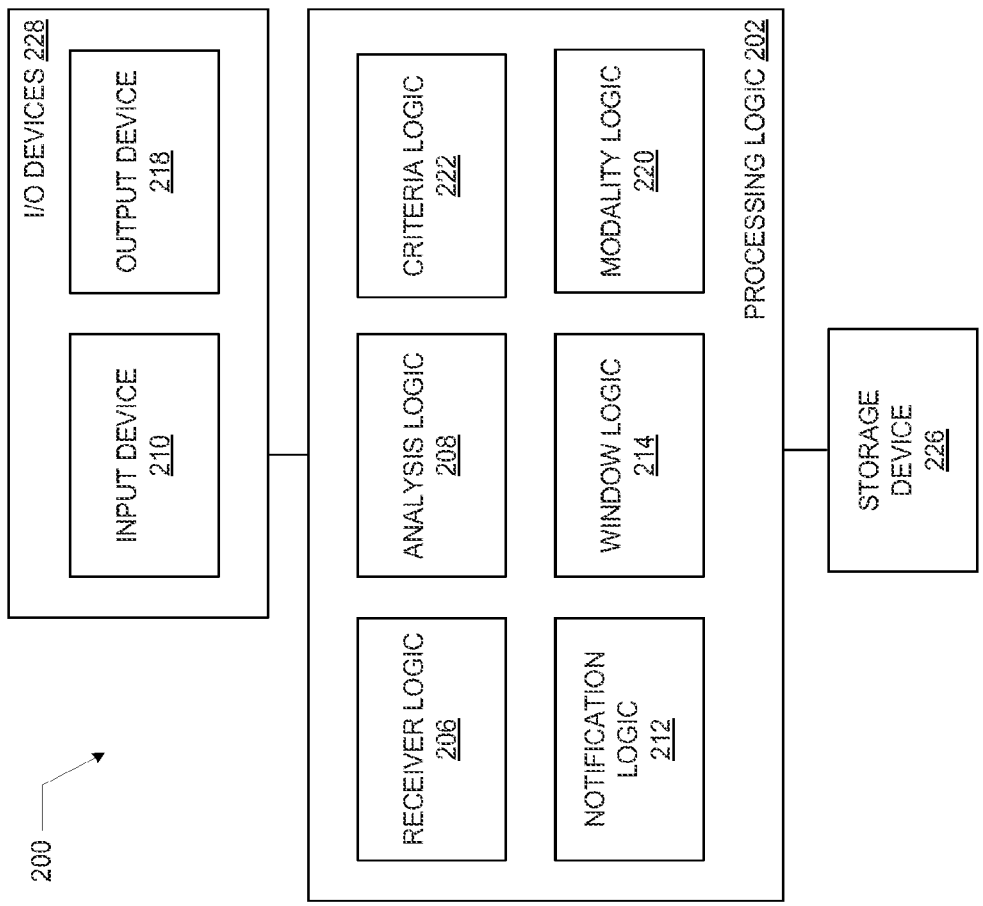
FIG. 2 is a block diagram of an illustrative message processing system that may be implemented by the computing system of FIG. 1, in accordance with various embodiments.

Embodiments related to a message processing system are disclosed herein. In some embodiments, a computing system may include receiver logic to receive a message addressed to a user; analysis logic to determine whether a message collection, including the received message, has a common theme (e.g., a common sender or common content); modality logic to identify a messaging modality associated with each of the messages in the message collection; criteria logic to determine whether the message collection satisfies modality criteria (e.g., the messages represent at least two different messaging modalities); and notification logic to provide a notification of the message collection in response to determining that the message collection has a common theme and satisfies the modality criteria.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As used herein, the phrases "coupled" or "operatively coupled" may mean that two or more elements are in direct physical or electrical contact, or that two or more elements are not in direct contact with each other, but yet still cooperate or interact with each other (e.g., via one or more intermediate elements, which may perform their own transformations or have their own effects). For example, two elements may be operatively coupled to each other when both elements communicate with a common element (e.g., a memory device).

Figure 1:
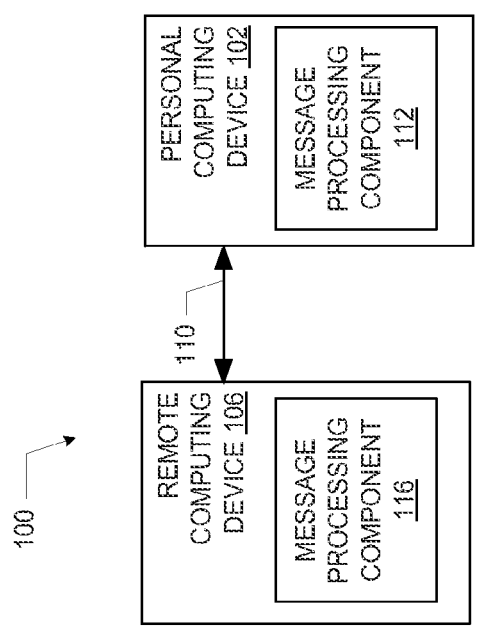
FIG. 1 is a block diagram of an illustrative computing system configured for message processing in accordance with the teachings of the present disclosure.

FIG. 1 depicts an illustrative computing system 100 configured for message processing in accordance with the teachings of the present disclosure. In some embodiments, the computing system 100 may be configured to receive a message addressed to a user, determine whether a message collection (including the received message and one or more previously detected messages) has a common theme, identify a messaging modality associated with each of the messages in the message collection, determine whether the message collection satisfies modality criteria, and provide a notification of the message collection in response to a determination that the message collection has a common theme and a determination that the message collection satisfies the modality criteria. Each of the personal computing device 102 and the remote computing device 106 may include message processing components (illustrated in FIG. 1 as message processing components 112 and 116, respectively). Message processing and other operations may be distributed between the message processing components 112 and 116 of the computing system 100 as suitable. Several examples of the distribution of message processing operations between the personal computing device 102 and the remote computing device 106 are discussed herein, but any other combination of more or less components and distribution of the operations may be used. For example, in some embodiments, the message processing component 112 or the message processing component 116 may be omitted, and all suitable message processing operations (e.g., those described herein) may be performed by the remaining message processing component. In some embodiments, the computing system 100 may be configured as the message processing system 200, discussed below with reference to FIG. 2.

The computing system 100, as alluded to earlier, may include a personal computing device 102 and a remote computing device 106. Except for the message processing teachings of the present disclosure incorporated therein, the personal computing device 102 and the remote computing device 106 may be a broad range of such devices known in the art. Specific, but not limiting examples are described below. Communication between the components of the computing system 100 may be enabled by the communication pathway 110. The communication pathway 110 may include a wired communication pathway and/or a wireless communication pathway, over direct couplings, and/or over personal, local and/or wide area networks. Each of the personal computing device 102 and the remote computing device 106 may include suitable hardware for supporting the communication pathway 110, such as network interface cards, modems, WiFi devices, Bluetooth devices, and so forth. In some embodiments, the communication pathway 110 may be a direct communication pathway between the personal computing device 102 and the remote computing device 106. As used herein, references to a "direct" communication pathway may refer to a communication pathway that does not route through another illustrated component, but that may route through other non-illustrated devices (e.g., routers and/or switches).

Each of the devices included in the computing system 100 may include a processing device and a storage device (not shown). The processing device may include one or more processing devices, such as one or more processing cores, ASICs, electronic circuits, processors (shared, dedicated, or group), combinational logic circuits, and/or other suitable components that may be configured to process electronic data. The storage device may include any suitable memory or mass storage devices (such as solid-state drive, diskette, hard drive, compact disc read only memory (CD-ROM) and so forth). Each of the computing devices included in the computing system 100 may include one or more buses (and bus bridges, if suitable) to communicatively couple the processing device, the storage device, and any other devices included in the respective computing devices. The storage device may include a set of computational logic, which may include one or more copies of computer readable media having instructions stored therein which, when executed by the processing device of the computing device, may cause the computing device to implement any of the techniques and methods disclosed herein, or any portion thereof. In some embodiments, the computational logic may include any of the logic discussed below with reference to FIG. 2.

The personal computing device 102 may be a computing device that is integrated into a garment, accessory or other support structure that is configured to be worn on the body of the user (or "wearer"). Examples of suitable support structures for a wearable personal computing device 102 may include glasses, a headset, a hair accessory (e.g., a headband or barrette), an ear piece, jewelry (e.g., brooch, earrings or a necklace), a wrist band (e.g., a wristwatch), a neck band (e.g., a tie or scarf), a garment (e.g., a shirt, pants, dress skirt or jacket), shoes, a lanyard or nametag, a contact lens, or an implantable support structure, among others. In some embodiments, the personal computing device 102 may be a wrist-mounted computing device having a camera and microphone. In some embodiments, the personal computing device 102 may be a glasses-mounted computing device having a camera and microphone. In some embodiments, the personal computing device 102 may include a "world-facing" camera (i.e., a camera directed away from the wearer) and a microphone.

The personal computing device 102 may be a desktop or stand-alone computing device, or a computing device configured for carrying in a pocket, backpack or other carrying case, and for operation with one or more of a user's hands. Examples of computing devices that may serve as the personal computing device 102 include cellular phones, smartphones, other handheld mobile communication devices, tablets, electronic book readers, personal digital assistants, laptops, or other such computing devices. Although the personal computing device 102 (and other components described herein) may be referred to in the singular, any number of personal computing devices may be included in the personal computing device 102 (and similarly, any component may include multiple such components).

Message processing and other operations performed by the personal computing device 102 may be controlled by an app or plug-in on the personal computing device 102, for example. In some embodiments, the personal computing device 102 may include two or more computing devices, one of which has more computing resources (e.g., processing power, memory, and/or communication bandwidth) than another. For example, the personal computing device 102 may include a larger tablet computing device and a smaller wrist- or glasses-mounted computing device. In such embodiments, data captured and preliminarily processed by the smaller computing device (e.g., the body and header information of a message) may be transmitted from the smaller computing device to the larger computing device for further processing (e.g., to determine whether multiple messages have common content, as discussed below).

The remote computing device 106 may include one or more servers (e.g., arranged in a "cloud" computing configuration) or other computing devices remote from the personal computing device 102. As discussed above, the communication pathway 110 between the personal computing device 102 and the remote computing device 106 may be configured according to any remote wired or wireless communication protocol. In some embodiments, the remote computing device 106 may have more computing resources (e.g., processing power, memory, and/or communication bandwidth) than the personal computing device 102. Thus, in some embodiments, data captured and preliminarily processed by the personal computing device 102 (e.g., sender information for a voice message or telephone call incoming to the personal computing device 102) may be transmitted over the communication pathway 110 to the remote computing device 106 for further processing. In some embodiments, the remote computing device 106 may perform most of the message processing operations discussed below with reference to FIG. 2, including those performed by the receiver logic 206, the analysis logic 208, the criteria logic 222, the modality logic 220, the notification logic 212 and/or the window logic 214. In some embodiments, the remote computing device 106 may include a storage device for storing message data that may be accessed when the computing system 100 performs a message processing operation in accordance with the techniques disclosed herein.

In some embodiments, the remote computing device 106 may communicate with a plurality of personal computing devices (e.g., configured similarly to the personal computing device 102). The remote computing device 106 may perform similar message processing and storage operations for each personal computing device. Similarly, the remote computing device 106 may communicate with a plurality of additional remote computing devices, and may perform message processing and storage operations with regard to messages received and/or sent by these additional remote computing devices. For example, the remote computing device 106 may receive messages received by or transmitted to a plurality of personal computing devices (configured similarly to the personal computing device 102) and/or a plurality of other remote computing devices, and may perform message processing on these messages (e.g., determining whether the messages have a common theme, identifying messaging modalities associated with the messages, determining whether modality criteria or satisfied, etc.). The remote computing device 106 may devote different resources to different ones of the plurality of personal computing devices or remote computing devices in communication with the remote computing device 106 (e.g., different memory partitions or databases for each device).

FIG. 2 is a block diagram of an illustrative message processing system 200, in accordance with various embodiments. The message processing system 200 may include input/output (I/O) devices 228, processing logic 202, and a storage device 226. The message processing system 200 may be configured to perform any of a number of message processing operations. For example, the message processing system 200 may be configured to receive a message addressed to a user, determine whether a message collection has a common theme, identify a messaging modality associated with each of the messages in the message collection, determine whether the message collection satisfies modality criteria, and provide a notification of the message collection in response to a determination that the message collection has a common theme and a determination that the message collection satisfies the modality criteria.

The message processing system 200 may be implemented by the computing system 100 of FIG. 1, in accordance with various embodiments. In particular, the components of the message processing system 200 may be distributed in any suitable manner among one or more of the components of the computing system 100. Although a number of components of the message processing system 200 are illustrated in FIG. 2, various embodiments may omit components as appropriate for the message processing operations to be performed. For example, some embodiments of the message processing system 200 may not be configured for user notification (and instead may process messages for use internal to the device or a particular application), and thus may not include the notification logic 212.

The I/O devices 228 may include an input device 210. As noted above, although the input device 210 may be referred to in the singular, the input device 210 may include multiple input devices, each operating according to one or more input modalities. The input device 210 may include an image capture device, such as one or more still image or video cameras. In some such embodiments, the input device 210 may further include a processing device which is configured to execute any known technique for combining the images or provide various image browsing experiences (e.g., in conjunction with other components of the message processing system 200, such as the output device 218). The input device 210 may include an audio capture device. The audio capture device may include one or more microphones. In some embodiments, the audio capture device may include multiple microphones with different orientations, which may allow the message processing system 200 to locate various speakers and correlate those locations with subjects identified in an image captured by an image capture device included in the input device 210. The input device 210 may be configured to receive a touch input, a voice input, or a gesture input, for example, and convert those inputs into electrical signals that may be communicated to other components of the message processing system 200. The input device 210 may include a keyboard, a cursor control device such as a mouse, a stylus, a touchpad, a bar code reader, a Quick Response (QR) code reader, an radio frequency identification (RFID) reader, a Global Positioning System (GPS) receiver, a short-range wireless receiver (e.g., a Bluetooth receiver), a longer-range wireless receiver, one or more sensors (e.g., an accelerometer or a motion detector), a phone receiver, or any other suitable input device. The input device 210 includes suitable hardware for supporting the receipt and transmission of messages between the message processing system 200 and other devices, such as network interface cards, modems, WiFi devices, Bluetooth devices, and so forth.

The message processing system 200 may include an output device 218. As discussed above with reference to the input device 210, although the output device 218 may be referred to in the singular, any number of output devices may be included in the output device 218. In some embodiments, the output device 218 may include a single output device (e.g., a single display). The output device 218 may include one or more heads-up displays (i.e., displays including a projector arranged in an optical collimator configuration and a combiner to provide data without requiring a user to look away from his or her typical viewpoint), computer monitors, projectors, touchscreen displays, liquid crystal displays (LCDs), light-emitting diode displays or flat panel displays, for example. The output device 218 may include an audio output device (which may include one or more speakers or other audio transducers which may be, for example, mounted in one or more earphones or earbuds), and/or one or more printers, projectors, wired or wireless transmitters for providing information to other devices, additional storage devices, or any suitable output device.

The message processing system 200 may include a storage device 226. In some embodiments, the storage device 226 may include one or more databases or other data storage structures for storing any of the data described herein (e.g., using the memory structure 300 discussed below with reference to FIG. 3, or any other suitable memory structure) for access by any of the components of the message processing system 200. The storage device 226 may include any memory device, such as one or more hard drives, solid state logic, or portable storage media, for example. The storage device 226 may be local to any one or more of the components of the processing logic 202 and/or the I/O devices 228, or remote from any component. The storage device 226 may include both local and remote components. The storage device 226 may include a plurality of different storage devices, which may be of different storage types (e.g., a hard drive and a portable storage device, for example).

The I/O devices 228 and the storage device 226 may be coupled to the processing logic 202. The processing logic 202 may include an input device interface (not shown) configured to receive data from one or more of the I/O devices 228 and route this data to one or more of the components of the processing logic 202. In some embodiments, the input device 210 may be operatively coupled with the receiver logic 206 to enable the receiver logic 206 to receive a message addressed to a user of the message processing system 200 (e.g., via a wired or wireless Internet, phone, text or other communication protocol). In some embodiments, the notification logic 212 may be operatively coupled with the output device 218 (e.g., a visual display device) to enable the notification logic 212 to provide a notification of a message collection. In some embodiments, the notification logic 212 may be operatively coupled with the input device 210 (e.g., a touchscreen or button) to enable the notification logic to display a message collection in response to a user selection of a visual or other notification. Although the components of the processing logic 202 are illustrated separately, the components may be combined or divided as suitable, and each may use one or more of the results generated by others in performing its own analysis. Data may be communicated between the components of the processing logic 202 over a physical bus, a long-distance wired communication pathway, a short- or long-distance wireless communication pathway, or any combination of communication pathways.

The processing logic 202 may include receiver logic 206. In some embodiments, the receiver logic 206 may be configured to receive a message addressed to a user of the message processing system 200. As used herein, the term "addressed" may include any technique by which a message may be identified as intended for a particular user. Examples of addressing techniques include those that identify the user (e.g., an e-mail address or a screen name in a chat system), those that identify a device associated with the user (e.g., an IP address or hardware identifier of some portion of the computing system 100), or those that identify a property of the user or a device associated with the user (e.g., a message broadcast to all devices within a particular area defined by GPS coordinates, or within a radius of a transmitter). The message received by the receiver logic 206 may be received from the input device 210 (e.g., from a phone receiver, a short message service (SMS) receiver, an Internet modem, etc.) or may be accessed from a memory (e.g., included in the storage device 226).

In some embodiments, the receiver logic 206 may be included in a personal computing device associated with the user of the message processing system 200 (e.g., the personal computing device 102 of FIG. 1). In some embodiments, the receiver logic 206 may be included in a computing device remote from a personal computing device on which the user may eventually receive notification of the message (e.g., the receiver logic 206 may be included in the remote computing device 106 of FIG. 1).

The processing logic 202 may include modality logic 220. The modality logic 220 may be operatively coupled to the receiver logic 206, and may be configured to identify a messaging modality associated with a message received by the receiver logic 206. The messages received at the receiver logic 206 may be associated with any of a number of messaging modalities, and the receiver logic 206 may be configured to receive messages associated with multiple different messaging modalities. Examples of messaging modalities by which the receiver logic 206 may be configured to receive messages include e-mail, social media messaging, phone, calendar invitations, text messaging, Internet service messaging, microblog messaging, chat and voicemail. A "social media messaging" modality may include any messaging technique that allows messaging between users of an electronic (e.g., Internet or wireless device-based) network, such as networks for sharing personal and/or professional information. A social media messaging modality may utilize an underlying communication protocol for the transmission of messages. For example, social media messages may be transmitted to a user via an Internet interface, or pushed to an Internet-enabled device using wireless transmission protocols. A "Internet service messaging" modality may include any Internet service by which a message may be sent to a user. Examples of Internet service messaging modalities may include electronic invitation services, restaurant reservation services, banking service messaging, and electronic health care communication services. As discussed above with reference to social media messaging, Internet service messaging may use an underlying communication protocol for the transmission of messages.

Messaging modalities may overlap; for example, an Internet-based electronic invitation service may transmit invitations to users via e-mail, or a banking service may notify a user by text message that a bank statement is available to view via a web interface. In various embodiments, the modality logic 220 may treat these "overlapping" messaging modalities as a same modality or different modalities. For example, in some embodiments, if the receiver logic 206 receives an e-mail indicating that the results of a medical test are available in an Internet-based health care communication service, the modality logic 220 (which may be coupled with the receiver logic 206 and may be configured to identify a messaging modality associated with a received message, as discussed in additional detail below), may identify the e-mail as associated with only the "e-mail" modality. In other embodiments, the modality logic 220 may identify the e-mail as associated with only the "health care communication service" modality. In other embodiments, the modality logic 220 may identify the e-mail as associated with both the "e-mail" and "health care communication service" modalities.

In some embodiments, the modality logic 220 may be configured to identify a messaging modality associated with each of the messages in a message collection. A "message collection," as used herein, may refer to a set of two or more messages received by the receiver logic 206. A message collection may include messages associated with two or more messaging modalities (e.g., a three message collection may include an e-mail and two text messages).

The processing logic 202 may include analysis logic 208. The analysis logic 208 may be configured to determine whether a message collection has a common theme. A message collection may have a "common theme" when the messages in the message collection have a common feature. In some embodiments, the analysis logic 208 may determine that a message collection has a common theme when the messages have a common sender. A sender may be an individual, an organization, or another entity. Two or more messages may have a "common sender" when the messages originate from a common individual, organization, or other entity. For example, some virtual world computing services allow "avatars" in the virtual world to communicate with each other in multiple ways, such as chatting with other avatars in a local area or sending a private message to another avatar. If a first avatar receives a first message from a second avatar via the local area chat modality, and receives a second message from the second avatar via the private messaging modality, the analysis logic 208 may determine that the two messages have a common sender. In some embodiments, a single sender may be associated with different identifiers for different messaging modalities. For example, a sender may be identified by one or more e-mail addresses in the e-mail modality, by one or more screen names in a chat modality, and by one or more phone numbers in a phone modality; the analysis logic 208 may identify all messages received via any of these modalities from any of the identifiers as having a common sender.

In some embodiments, the analysis logic 208 may determine that a message collection has a common theme when the messages have common content. Messages may have common content when they reference a same person, event, object, occurrence, location, or any other feature or combination of features, for example. For example, the analysis logic 208 may analyze an e-mail message having a body that reads "Just wanted to catch up—David stopped by looking for you. Are you going to Carl's birthday party?" and a social media message with a subject line that reads "You're Invited: Carl's Surprise Party," and determine that the two messages have common content related to Carl's party. The analysis logic 208 may be configured to use any information in a message as part of a content analysis. For example, the analysis logic 208 may analyze a message from David and a message referring to David, and determine that the two messages have common content related to David. The analysis logic 208 may use any known analysis techniques to identify the content of various messages, and compare that content across two or more messages to determine whether two or more messages have common content. Examples of such techniques include identifying common or similar keywords; identifying commonly referred-to individuals, organizations or events; identifying words having related semantic meanings as determined by natural language processing techniques; and voice recognition techniques to identify similar sounding words or names.

The analysis logic 208 may analyze a particular message in the context of multiple different message collections. For example, in some embodiments, a message collection analyzed by the analysis logic 208 may include messages that are timestamped within a predetermined window. A "timestamp" may represent a time at which the message was sent, a time at which the message was received, or some other time related to the transmission or receipt of the message. A timestamp may be included in a header of the message, a body of the message, or may be stored in a memory in association with the message (e.g., as shown in the memory structure 300 of FIG. 3, discussed below).

The processing logic 202 may include window logic 214, which may be configured to determine whether the timestamps of various messages fall within one or more windows of interest. The window logic 214 may be operably coupled with the receiver logic 206 and the analysis logic 208. The window logic 214 may have access to one or more parameters (stored, e.g., in the storage device 226) that define the length of various windows of interest (e.g., as measured in seconds, minutes, hours or days). A window may be defined by an interval associated with a particular time. For example, the particular time may be the time of receipt of a newly received message, and the interval of time may be the interval immediately preceding the particular time and having a predetermined length. In another example, the particular time may be the time of receipt of a newly received message, and the window may be an interval of predetermined length centered around the particular time. In some embodiments, a window may not have a predetermined length, but may be defined in relation to other events; for example, a window may be defined as the five messages received immediately prior to the receipt of a particular message.

In some embodiments, the window logic 214 may be configured to determine whether one or more messages falls within a "sender window" with respect to a particular time. The particular time may be the time of receipt of a newly received message, for example, and the sender window may refer to an interval of predetermined length immediately preceding or centered around the receipt of the newly received message.

In some embodiments, the analysis logic 208 may only analyze whether a message collection has a common sender if the messages in the message collection are timestamped within the sender window, as determined by the window logic 214. In some embodiments, the window logic 214 may be configured to determine whether one or more messages fall within a "content window" with respect to a particular time (e.g., a predetermined interval preceding or centered around receipt of a newly received message). In some such embodiments, the analysis logic 208 may only analyze whether a message collection has common content if the messages in the message collection are timestamped within the content window, as determined by the window logic 214. The window logic 214 may also use additional parameters that define other windows of interest. In some embodiments, different messaging modalities may be associated with different windows. For example, the analysis logic 208 may only analyze a message collection for a common theme if all e-mails in the collection are timestamped within a five minute window and all text messages are timestamped within a two minute window. In analyzing messages for a common theme, the analysis logic 208 may consider all combinations of two or more messages in a window of interest. For example, if there are four messages A, B, C and D in a window of interest, the analysis logic 208 may evaluate all 16 potential message collections that arise out of various combinations of messages A, B, C and D.

The processing logic 202 may include criteria logic 222. The criteria logic 222 may be operatively coupled with the modality logic, and may be configured to determine whether a message collection (e.g., as analyzed by the analysis logic 208) satisfies one or more modality criteria. The criteria logic 222 may access parameters representative of the one or more modality criteria from a memory (e.g., from the storage device 226), and may apply the criteria to the messages in a message collection. The modality criteria may specify a set of conditions on the modalities of messages in the message collection. In some embodiments, the modality criteria may specify that at least two different messaging modalities be associated with messages in the message collection; in other words, that at least one message in the message collection is associated with a first messaging modality and that at least one other message in the message collection is associated with a second messaging modality different from the first. In some embodiments, the modality criteria may specify that at least three, four, or five different messaging modalities be associated with messages in the message collection. In some embodiments, the modality criteria may specify that there must be at least one message corresponding to one or more particular modalities within the message collection (for example, that at least one of the messages in the message collection be a voice message). In some embodiments, the modality criteria may specify various conditions under which various criteria apply. For example, the modality criteria may specify that at least three messaging modalities need be represented in the message collection, unless there are at least three voice messages received within a one minute window in the message collection, in which case the modality criteria are satisfied.

The processing logic 202 may include notification logic 212. The notification logic 212 may be configured to provide a notification of a message collection (e.g., via the personal computing device 102 of FIG. 1). In some embodiments, the receiver logic 206 may be located on a server or other device (e.g., the remote computing device 106) remote from a personal computing device (e.g., the personal computing device 102) on which the user receives the notification of the message collection from the notification logic 212. As discussed above, the notification logic 212 may be operatively coupled with the output device 218 (e.g., a visual display device) to enable the notification logic 212 to provide a notification of a message collection. In some embodiments, the notification logic 212 may be operatively coupled with the input device 210 (e.g., a touchscreen or button) to enable the notification logic 212 to display a message collection in response to a user selection of a visual or other notification. The notification logic 212 may be operatively coupled with the criteria logic 222 and the analysis logic 208.

In some embodiments, the notification logic 212 may provide a notification of the message collection in response to a determination, by the analysis logic 208, that the message collection has a common theme. In some embodiments, the notification logic 212 may provide a notification of the message collection in response to a determination, by the criteria logic 222, that the message collection satisfies the modality criteria. In some embodiments, the notification logic 212 may provide a notification of the message collection in response to both a determination, by the analysis logic 208, that the message collection has a common theme and a determination, by the criteria logic 222, that the message collection satisfies the modality criteria.

In some embodiments, the notification logic 212 may provide a notification of the message collection by providing a visual notification on a personal computing device (e.g., the personal computing device 102) associated with the user. The visual notification may indicate that the message collection is available for viewing. The visual notification may be displayed on a touchscreen, glasses-mounted or other display included in the output device 218. In some embodiments, the notification logic 212 may provide a notification of the message collection by providing a tactile notification (e.g., a vibration) using suitable hardware included in the output device 218. In some embodiments, the notification logic 212 may provide a notification of the message collection by providing an audible notification (e.g., a tone or song) using one or more speakers included in the output device 218. The notification logic 212 may be configured to use multiple notification techniques (e.g., visual, tactile and/or audible) to provide a notification of the message collection. The notification logic 212 may include any suitable hardware and/or software (e.g., device drivers) to cause the output device 218 to provide a notification.

In some embodiments, the notification logic 212 may provide a notification of the message collection prior to any of the messages in the message collection being viewed or listened to (e.g., by the user). For example, the notification logic 212 may be configured to provide an on-screen display when a users personal computing device is in a "home screen" mode, or when the user is operating a non-messaging application using the personal computing device, before the user has activated a messaging application to view one or more of the messages in the message collection. In some embodiments, a visual notification provided by the notification logic 212 may be selectable by the user (e.g., using the input device 210). Selection of the notification may cause the display of the messages in the message collection (e.g., via a visual display included in the output device 218).

Embodiments of the message processing systems and techniques disclosed herein may provide improvements over existing messaging technologies. At best, most such technologies require a user to manually designate which incoming messages are important, and then may attempt to apply machine learning algorithms to predict how important future messages might be to the same user. Not only does such an approach require a great deal of manual curation on the part of the user, but such an approach also focuses solely on the user receiving the messages. Existing technologies fail to recognize that theme and/or modality information, evaluated from the perspective of the sender of messages rather than the receiver, may provide a useful basis on which to selectively notify a user of incoming messages. For example, when a child of the user wishes to reach the user in an emergency, the child may attempt to contact the user by phone, text and e-mail. This multi-modality attempt may indicate the importance of the communication from the child's perspective, and thus embodiments of the present disclosure may "escalate" such collections of messages to the attention of the user. In particular, embodiments of the present disclosure may recognize a "burst" of messages across multiple messaging modalities from the same sender, or from multiple senders but having common content, which may represent a break from "ordinary" patterns of received messages, and may selectively notify the user of these messages while keeping other messages suppressed or available in the background. Further, by presenting messages as a collection, some of the presently disclosed embodiments allow a user to receive important information after it has been aggregated into a cohesive display, reducing distraction and the amount of time the user needs to cognitively process the messages.

FIG. 3 depicts an illustrative memory structure 300 for storing message data (generated, e.g., by the receiver logic 206, the analysis logic 208, the criteria logic 222, the modality logic 220, the window logic 214, and/or the notification logic 212) to enable message collection notification, in accordance with various embodiments. Message data arranged in the memory structure 300 (or any other memory structure) may be stored in the storage device 226. As discussed above, the storage device 226 may include a database or other data storage structure which may include memory structures (such as the memory structure 300) for storing message data and other data. The memory structure 300 is an illustrative example of a possible memory structure, and any memory structure containing information to enable the processing operations disclosed herein may be used. Further, as illustrated in FIG. 3 by empty brackets "{

}," not all fields need or may be populated for each message indexed in the memory structure 300.

The memory structure 300 may be principally indexed by a message identifier, and may include a number of data fields. The memory structure 300 may include a message identifier field 302, which may store an identifier of a received message (e.g., a numeric identifier). In some embodiments, the memory structure 300 may not include a message identifier field, and may instead identify a message using one or more other fields of the memory structure 300 (e.g., using a combination of the time received field 304 and the modality field 312). The message identifier field 302 may be populated by the receiver logic 206. The memory structure 300 may include a time received field 304, which may store a value (including, e.g., a date, a day of the week, and a time zone) representing a time at which the message was received by the receiver logic 206. The time received field 304 may be populated by the receiver logic 206. The memory structure 300 may include a time sent field 306, which may store a value (including, e.g., a date, a day of the week, and a time zone) representing a time at which the message was sent to the user associated with the receiver logic 206. The time sent field 306 may be populated by the receiver logic 206 using time information conveyed in a header or other data associated with the received message. In various embodiments, a timestamp associated with a message may use the value stored in the time received field 304 or the value stored in the time sent field 306.

The memory structure 300 may include a sender field 308, which may store a name or other identifier of a sender of a message. The sender field 308 may be populated by the receiver logic 206 using sender information conveyed in a header or other data associated with the received message. For example, the receiver logic 206 may populate the sender field 308 using the name of an e-mail sender in the "From" field of an e-mail, or by the phone number associated with an incoming call. In some embodiments, a same sender may be represented in multiple different ways in the sender field 308. For example, FIG. 3 depicts Message ID 58 having the sender "Smith, David" and Message ID 59 having the sender "David Smith." In some embodiments, the memory structure 300 may include a sender ID field 310, which may be populated by the receiver logic 206 in consultation with an address book or other database of contacts stored in the storage device 226. The sender ID field 310 may include a unique sender ID value that may be associated with multiple sender names (e.g., that may appear in the sender field 308). For example, FIG. 3 depicts Message ID 58 and Message ID 59 as having the same sender ID 673. The analysis logic 208 may use one or more of the sender field 308 and the sender ID field 310 in determining whether messages in a message collection have a common sender.

The memory structure 300 may include a modality field 312, which may store a messaging modality associated with the message. The modality field 312 may be populated by the receiver logic 206 or the modality logic 220. In some embodiments, the modality field 312 may allow multiple messaging modalities to be stored for any one message. The memory structure 300 may include a subject field 314, which may store a subject associated with the message. The subject field 314 may be populated by the receiver logic 206, and may only been populated when a message has an associated subject line or field (e.g., an e-mail). In some embodiments, the receiver logic 206 may populate the subject field 314 using the first words of a text message, a transcription of a portion of a voice message, or any other technique for extracting a subject from a message.

The memory structure 300 may include a sender window field 316. For a particular message, the sender window field 316 may store the message IDs of other messages falling within a sender window as the particular message (e.g., the sender window discussed above with reference to the window logic 214). For example, FIG. 3 represents an embodiment in which the sender window, with respect to the time of receipt of a particular message, is the 3 minutes prior to receipt of the particular message. Consequently, with respect to the sender window associated with Message ID 61, Message IDs 58, 59 and 60 were received within 3 minutes prior to the receipt of Message ID 61, and thus the message IDs "58," "59," and "60" are stored in the sender window field 316 (e.g., by the window logic 214). If the parameters of the sender window were varied, the values stored in the sender window field 316 may vary accordingly.

The memory structure 300 may include a content window field 318. For a particular message, the content window field 318 may store the message IDs of other messages falling within a content window as the particular message (e.g., the content window discussed above with reference to the window logic 214). For example, FIG. 3 represents an embodiment in which the content window, with respect to the time of receipt of a particular message, is the 10 minutes prior to receipt of the particular message. Consequently, with respect to the content window associated with Message ID 61, Message IDs 56, 57, 58, 59 and 60 were received within 10 minutes prior to the receipt of Message ID 61, and thus the message IDs "56," "57," "58," "59," and "60" are stored in the content window field 318 (e.g., by the window logic 214). As noted above with reference to the sender window, if the parameters of the content window were varied, the values stored in the content window field 318 may vary accordingly.

The memory structure 300 may include a themed collections field 320, which may store identifiers of one or more message collections to which a particular message belongs. The message collections identified in the themed collections field 320 may be those message collections that have a common theme, as determined by the analysis logic 208, but which may or may not satisfy any modality criteria (e.g., as determined by the modality logic 220). Any particular message may belong to none, one, or two or more themed message collections. A themed message collection may be based on common content, a common sender, or both.

For example, Message ID 61 is shown in FIG. 3 as included in two content-based themed collections by the indicators {content=carl_birthday} and {content=david}. With respect to {content=carl_birthday}, when Message ID 61 was processed by the analysis logic 208, the analysis logic 208 analyzed the other messages within the content window associated with Message ID 61 (namely, Message IDs 58, 59 and 60, as determined by the window logic 214), determined that Message ID 61 have content ("carl_birthday") in common with one or more messages within the content window, and stored the indicator {content=carl_birthday} in the themed collections field 320 of the messages in the window sharing the common content (namely, Message IDs 58, 60 and 61). With respect to {content=david}, when Message ID 61 was processed by the analysis logic 208, the analysis logic 208 analyzed the other messages within the content window associated with Message ID 61 (namely, Message IDs 58, 59 and 60, as determined by the window logic 214), determined that Message ID 61 had content ("david") in common with one or more messages within the content window, and stored the indicator {content=david} in the themed collections field 320 of the messages in the window sharing the common content (namely, Message IDs 58, 59 and 61). Similar operations may be performed by the analysis logic 208 with respect to messages having a common sender, using the messages identified in the sender window field 316.

The memory structure 300 may include a notification field 322, which may store an indicator of which, if any, message collection notifications were provided to the user after processing of the particular message was complete. The notification field 322 may be populated by the notification logic 212. In some embodiments, the notification logic 212 may populate the notification field 322 (and correspondingly notify a user of a message collection) when a themed message collection (identified in the themed collections field 320) also meets the modality criteria (as determined by the modality logic 220). For example, in the embodiment illustrated in FIG. 3, the modality criteria implemented by the modality logic 220 may specify that messages in a message collection having common content must be associated with at least three different messaging modalities before a user will be notified of the message collection. Thus, even though there are three messages having common content "carl_birthday" with Message ID 62 in that message's content window (namely, Message IDs 60, 61 and 62), only two different messaging modalities are associated with those messages (namely, "calendar" for Message ID 60 and "e-mail" for Message IDs 61 and 62), and thus the notification logic 212 may not provide a notification of the message collection upon receipt and processing of Message ID 62. However, the four messages having common content "carl_birthday" in the content window associated with Message ID 63 are associated with three different messaging modalities (namely, "calendar," "e-mail" and "chat"), and thus the notification logic 212 may provide a notification of the message collection upon receipt and processing of Message ID 63 (as indicated in the notification field 322). In FIG. 3, Message ID 56 is also indicated as belonging to a themed collection with the common theme of {content=carl_birthday}, even though Message ID 56 falls outside the content window of Message ID 63. In some embodiments, once a message collection has been identified as having a common theme, the analysis logic 208 may examine messages falling outside the initial content window and add those messages to the message collection if those messages have the common content. In some embodiments, the analysis logic 208 may examine messages falling with a second window (determined, e.g., by the window logic 214) in this second round of analysis.

FIGS. 4-6 illustrate example displays 400, 500 and 600 for notifying a user of messages, in accordance with various embodiments. The displays 400-600 are examples of visual notifications that indicate that various message collections are available for viewing by the user. Any of the displays 400-600 may be displayed by a visual display device (e.g., a touchscreen, a heads-up display, a projector) included in the output device 218 and controlled by the notification logic 212. Any one or more elements of any of the displays 400-600 may be omitted, repeated, rearranged, or otherwise adjusted as appropriate. In some embodiments, the displays 400, 500 and 600 may be displayed in sequence in response to the message processing system 200 receiving the messages illustrated in the memory structure 300 of FIG. 3. In particular, the display 400 may be provided by the notification logic 212 in response to the receipt and processing of Message ID 59, the display 500 may be provided by the notification logic 212 in response to the receipt and processing of Message ID 61, and the display 600 may be provided by the notification logic 212 in response to the receipt and processing of Message ID 63. In some embodiments, any of the displays 400-600 may be provided prior to any of the messages in any of the indicated message collections being viewed or listened to (e.g., by the user or another party).

In FIG. 4, the display 400 may include a notification box 402, notification text 404, and notification icons 406. The notification box 402 may be an overlay or other on-screen element in which notification information may be presented. The notification text 404 may provide the user with information about a message collection that has been determined to have a common theme (e.g., by the analysis logic 208) and to meet modality criteria (e.g., by the modality logic 220). Examples of information that may be included in the notification text 404 are the number of messages in the collection, the modalities represented in the collection, the time at which the first message in the collection was received, the time at which the last message in the collection was received, the theme that is common among the messages (e.g., sender or content), the nature of the common content if the message collection has common content (e.g., "from David Smith"), a callback number or other contact information for a sender if the message collection has a common sender, or any other suitable information. The information included in the notification text 404 may be configurable by a user (e.g., via an "options" interface to the personal computing device 102). The notification icons 406 may indicate which modalities are represented in the message collection; for example, the notification icons 406 may indicate that the two messages received from David Smith include a voice message and a text message.

In FIG. 5, the display 500 may include a notification box 502, notification text 504, and notification icons 506. The elements of the display 500 may be similar to those discussed above with reference to FIG. 4. As noted above, the display 500 may be provided by the notification logic 212 in response to the receipt and processing of Message ID 61. In some embodiments, the display of the notification box 502 may replace the display of the notification box 402 since the messages included in the message collection referred to by the notification box 402 are also included in the message collection referred to by the notification box 502 (as shown in FIG. 3). In this manner, new notification boxes may replace old notification boxes if all messages referred to in the old notification box are also included in the new notification box.

In FIG. 6, the display 600 may include the notification box 502, a notification box 602, notification text 604, and notification icons 606. The elements of the display 600 may be similar to those discussed above with reference to FIG. 4. As noted above, the display 600 may be provided by the notification logic 212 in response to the receipt and processing of Message ID 61. In some embodiments, the display 600 may include both the notification box 502 and the notification box 602, since the messages included in the message collection referred to by the notification box 502 are not all included in the message collection referred to by the notification box 602 (as shown in FIG. 3). In this manner, new notification boxes may not replace old notification boxes if all messages referred to in the old notification box are not also included in the new notification box.

In some embodiments, a notification box, notification text, or notification icons (such as any of those discussed above with reference to FIGS. 4-6) may be selectable by a user (using, e.g., the input device 210). In response to a user selection, the notification logic 212 or other logic may be configured to display the message collection for the user. The messages in the message collection may be displayed in a list or any other suitable format.

Figure 7:
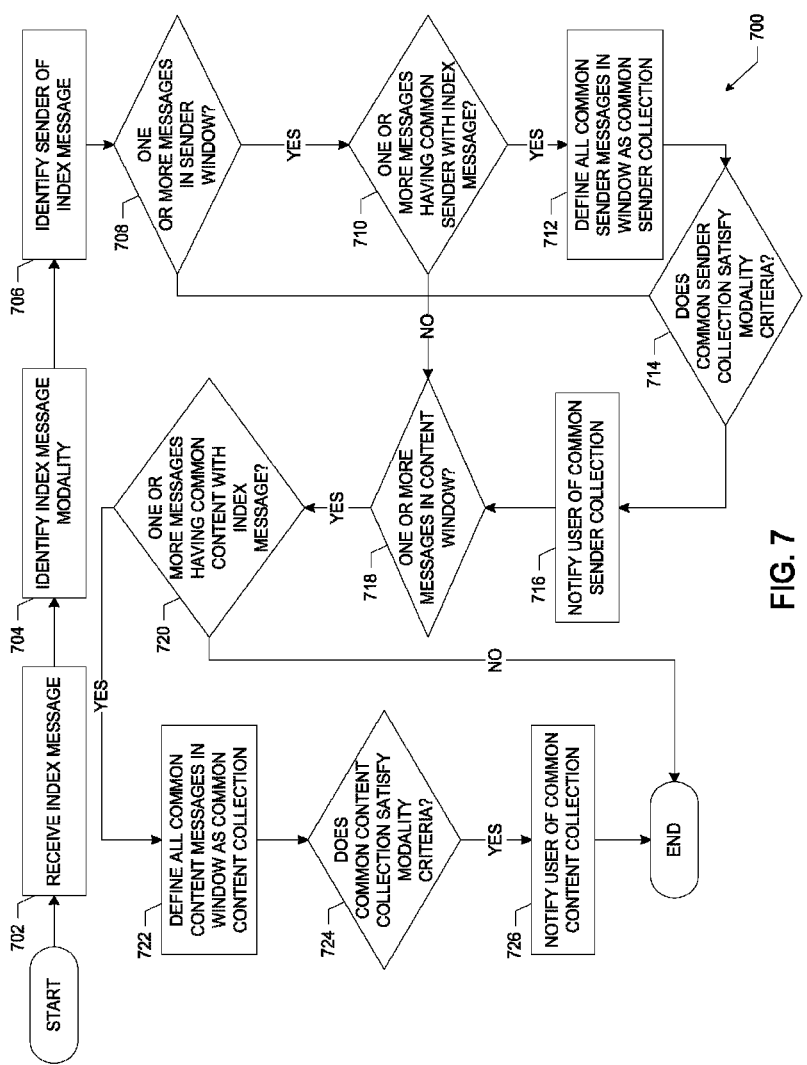
FIG. 7 is a flow diagram of an illustrative process for processing messages, in accordance with various embodiments.

FIG. 7 is a flow diagram illustrating a process 700 for processing messages, in accordance with some embodiments. It may be recognized that, while the operations of the process 700 are arranged in a particular order and illustrated once each, in various embodiments, one or more of the operations may be repeated, omitted or performed out of order. In particular, the operations of the process 700, although illustrated as performed in a particular sequence for the sake of illustration, may be performed in parallel as suitable. For example, operations related to determining whether there is a common sender collection and operations related to determining whether there is a common content collection may be performed in parallel or partially in parallel, or in any suitable order.

Operations of the process 700 may be described as performed by the message processing system 200 (which may be embodied in the computing system 100) for illustrative purposes, but the operations of the process 700, including individual operations of the process 700, may be performed by any suitably configured computing device or collection of computing devices. Any of the operations of the process 700 may be performed in accordance with any of the embodiments of the systems 100 and 200 described herein.

The process 700 may begin at the operation 702, in which the message processing system 200 (e.g., the receiver logic 206) may receive a message. The message received at the operation 702 may be referred to as the "index" message, for ease of reference.

At the operation 704, the message processing system 200 (e.g., the modality logic 220) may identify a messaging modality associated with the index message. The modality logic 220 may identify one modality associated with the index message at the operation 704, or two or more modalities. Examples of modalities that may be identified at the operation 704 include e-mail, social media messaging, phone, calendar invitations, text messaging, Internet service messaging, microblog messaging, chat and voicemail.

At the operation 706, the message processing system 200 (e.g., the receiver logic 206) may identify a sender of the index message. The sender may be identified by name (e.g., as illustrated by the sender field 308 of the memory structure 300 of FIG. 3) or by a sender ID (e.g., as illustrated by the sender ID field 310 of FIG. 3). A sender may be an individual, an organization, or a combination.

At the operation 708, the message processing system 200 (e.g., the window logic 214) may determine whether there are one or more messages in a sender window associated with the index message. As discussed above, a sender window may refer to a window of time or messages in which a collection of messages may be analyzed by the analysis logic 208 for a common sender.

If the message processing system 200 determines at the operation 708 that there are one or more messages in the sender window, the message processing system 200 may proceed to the operation 710 and determine (e.g., using the analysis logic 208) whether there are one or more messages in the sender window having a common sender with the index message. If the message processing system 200 determines at the operation 710 that there are one or more messages in the sender window having a common sender with the index message, the message processing system 200 may proceed to the operation 712 and define a message collection having all messages in the sender window which have a common sender with the index message. This message collection may be referred to as a "common sender collection."

Following the operation 712, the message processing system 200 may proceed to the operation 714 and determine (using, e.g., the criteria logic 222) whether the common sender collection satisfies modality criteria. In some embodiments, as discussed above, the modality criteria may specify that at least two different messaging modalities be associated with messages in the common sender collection. If the message processing system 200 determines at the operation 714 that the common sender collection satisfies the modality criteria, the message processing system 200 may proceed to the operation 716 and provide a notification of the common sender collection. This notification, which may be executed by the notification logic 212, may include a visual notification (e.g., any of the displays discussed above with reference to FIGS. 4-6) on a personal computing device associated with the user (e.g., the personal computing device 102), and may be selectable by the user to cause the display of the common sender collection.

If the message processing system 200 determines at the operation 708 that there are not one or more messages in a sender window associated with the index message, or determines at the operation 710 that there are not one or more messages in the sender window having a common sender with the index message, or determines at the operation 714 that the common sender collection does not satisfy the modality criteria, the message processing system 200 may proceed to the operation 718. The message processing system 200 may also proceed to the operation 718 upon completion of the operation 716.

At the operation 718, the message processing system 200 (e.g., the window logic 214) may determine whether there are one or more messages in a content window associated with the index message. As discussed above, a content window may refer to a window of time or messages in which a collection of messages may be analyzed by the analysis logic 208 for common content.

If the message processing system 200 determines at the operation 718 that there are one or more messages in the content window, the message processing system 200 may proceed to the operation 720 and determine (e.g., using the analysis logic 208) whether there are one or more messages in the content window having common content with the index message. If the message processing system 200 determines at the operation 720 that there are one or more messages in the content window having common content with the index message, the message processing system 200 may proceed to the operation 722 and define a message collection having all messages in the sender window which have common content with the index message. This message collection may be referred to as a "common content collection."

Following the operation 722, the message processing system 200 may proceed to the operation 724 and determine (using, e.g., the criteria logic 222) whether the common content collection satisfies modality criteria. In some embodiments, as discussed above, the modality criteria may specify that at least two different messaging modalities be associated with messages in the common content collection. The modality criteria applied to the common content collection at the operation 724 may be different from the modality criteria applied to the common sender collection at the operation 714. If the message processing system 200 determines at the operation 724 that the common sender collection satisfies the modality criteria, the message processing system 200 may proceed to the operation 726 and provide a notification of the common content collection. This notification, which may be executed by the notification logic 212, may include a visual notification (e.g., any of the displays discussed above with reference to FIGS. 4-6) on a personal computing device associated with the user (e.g., the personal computing device 102), and may be selectable by the user to cause the display of the message collection. The process 700 may then end.

The following paragraphs provide a number of examples of the embodiments disclosed herein. Example 1 is a computing system for message processing, including: receiver logic to receive a message addressed to a user; analysis logic, operatively coupled with the receiver logic, to determine whether a message collection, including the message and one or more previously detected messages, has a common theme, wherein the message collection has a common theme when the messages in the message collection have a common sender or have common content; modality logic, operatively coupled with the receiver logic, to identify a messaging modality associated with each of the messages in the message collection; criteria logic, operatively coupled with the modality logic, to determine whether the message collection satisfies modality criteria, wherein the modality criteria specify that at least two different messaging modalities be associated with messages in the message collection; and notification logic, operatively coupled with the criteria logic, to provide a notification of the message collection in response to a determination that the message collection has a common theme and a determination that the message collection satisfies the modality criteria.

Example 2 may include the subject matter of Example 1, and may further include window logic, operatively coupled with the receiver logic and the analysis logic, to determine whether the message has a timestamp falling within a predetermined window of time, wherein a timestamp of the message represents a time at which the message was sent or the message was received and wherein the message collection includes only messages timestamped within the predetermined window of time.

Example 3 may include the subject matter of any of Examples 1-2, and may further specify that the receiver logic is located in a personal computing device associated with the user.

Example 4 may include the subject matter of any of Examples 1-3, and may further specify that the receiver logic is located on a server remote from a personal computing device on which the user receives the notification of the message collection.

Example 5 may include the subject matter of any of Examples 1-4, and may further specify that provide a notification of the message collection includes provide a visual notification on a personal computing device associated with the user, the visual notification indicating that the message collection is available for viewing and information about the message collection, including number of messages, a theme of the message collection, and the modalities associated with messages in the message collection.

Example 6 may include the subject matter of Example 5, and may further specify that the visual notification is selectable using an input device, and wherein the message collection is displayed in response to selection of the visual notification by the user.

Example 7 may include the subject matter of any of Examples 1-6, and may further specify that the notification logic is to notify the user of the message collection prior to any of the messages in the message collection being viewed or listened to.

Example 8 may include the subject matter of any of Examples 1-7, and may further specify that the at least two different messaging modalities include two or more of e-mail, social media messaging, phone, calendar invitations, text messaging, Internet service messaging, microblog messaging, chat and voicemail.

Example 9 is a method for message processing, including: receiving, with a computing system, a message addressed to a user; determining, with the computing system, whether a message collection, including the message and one or more previously detected messages, has a common theme, wherein the message collection has a common theme when the messages in the message collection have a common sender or have common content; identifying, with the computing system, a messaging modality associated with each of the messages in the message collection; determining, with the computing system, whether the message collection satisfies modality criteria, wherein the modality criteria specify that at least two different messaging modalities be associated with messages in the message collection; and in response to determining that the message collection has a common theme and determining that the message collection satisfies the modality criteria, notifying the user, with the computing system, of the message collection.

Example 10 may include the subject matter of Example 9, and may further include determining, with the computing system, whether the message has a timestamp falling within a predetermined window of time, wherein a timestamp of the message represents a time at which the message was sent or the message was received, and wherein the message collection includes only messages timestamped within the predetermined window of time.

Example 11 may include the subject matter of any of Examples 9-10, and may further specify that the computing system includes a personal computing device associated with the user, and receiving a message addressed to a user comprises receiving, by the personal computing device, a message addressed to a user.

Example 12 may include the subject matter of any of Examples 9-11, and may further specify that the computing system includes a server remote from a personal computing device on which the user receives the notification of the plurality of messages.

Example 13 may include the subject matter of any of Examples 9-12, and may further specify that notifying the user of the message collection includes providing a visual notification on a personal computing device associated with the user, the visual notification indicating that the message collection is available for viewing and information about the message collection, including number of messages, a theme of the message collection, and the modalities associated with messages in the message collection.

Example 14 may include the subject matter of Example 13, and may further specify that the visual notification is selectable using an input device, and wherein the message collection is displayed in response to selection of the visual notification by the user.

Example 15 may include the subject matter of any of Examples 9-14, and may further specify that the notification logic is to provide a notification of the message collection prior to any of the messages in the message collection being viewed or listened to.

Example 16 may include the subject matter of any of Examples 9-15, and may further specify that the at least two different messaging modalities include two or more of e-mail, social media messaging, phone, calendar invitations, text messaging, Internet service messaging, microblog messaging, chat and voicemail.

Example 17 is a computing system for message processing, including means for performing the method of any of Examples 9-16.

Example 18 is one or more computer readable media having instructions thereon that, when executed by one or more processing devices of a computing device, cause the computing device to perform the method of any of Examples 9-16.

Example 19 is a system including one or more processing devices and one or more computer readable media having instructions thereon that, when executed by the one or more processing devices, cause the apparatus to perform the method of any of Examples 9-16.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein.

What is claimed is:

1. A computing system for message processing, comprising:
    at least one processor coupled with at least one storage device, wherein the at least one processor is to operate:
    receiver logic to receive a message addressed to a user;
    analysis logic, operatively coupled with the receiver logic, to determine whether the received message has a theme that is similar to a theme of a message collection, comprising one or more previously detected messages including an index message, wherein the message collection and the received message have a similar theme when the messages in the message collection have a common sender or have common content as the received message, and wherein the analysis logic is to define the theme of the message collection according to a sender and a modality of the index message, wherein the index message is a first message received by the receiver logic at a beginning of a predetermined window of time;
    modality logic, operatively coupled with the receiver logic, to identify a messaging modality associated with each of the messages in the message collection, wherein the messaging modality comprises a mode in which each of the messages in the message collection was sent including one of e-mail, social media, phone call, calendar invitation, text message, Internet service message, microblog message, chat message, or voicemail;
    criteria logic, operatively coupled with the modality logic, to determine whether the message collection satisfies modality criteria, wherein the modality criteria specify that at least two different messaging modalities be associated with messages in the message collection, wherein the at least two different messaging modalities comprise two or more of e-mail, social media messaging, phone, calendar invitations, text messaging Internet service messaging, microblog messaging, chat messaging, or voicemail; and
    notification logic, operatively coupled with the criteria logic, to provide a notification of the message collection in response to a determination that the message collection has a similar theme and a determination that the message collection satisfies the modality criteria.

2. The computing system of claim 1, further comprising:
    window logic, operatively coupled with the receiver logic and the analysis logic, to determine whether the message has a timestamp falling within the predetermined window of time, wherein a timestamp of the message represents a time at which the message was sent or the message was received;
    wherein the message collection comprises only messages timestamped within the predetermined window of time.

3. The computing system of claim 1, wherein the receiver logic is located in a personal computing device associated with the user.

4. The computing system of claim 1, wherein the receiver logic is located on a server remote from a personal computing device on which the user receives the notification of the message collection.

5. The computing system of claim 1, wherein provide a notification of the message collection comprises provide a visual notification on a personal computing device, the visual notification indicating that the message collection is available for viewing and information about the message collection, including number of messages, a theme of the message collection, and the modalities associated with messages in the message collection.

6. The computing system of claim 5, wherein the visual notification is selectable using an input device, and wherein the message collection is displayed in response to selection of the visual notification by the user.

7. The computing system of claim 1, wherein the notification logic is to provide a notification of the message collection prior to any of the messages in the message collection being viewed or listened to.

8. A method for message processing, comprising:
    receiving, with a computing system, a message addressed to a user;
    determining, with the computing system, whether the received message has a theme that is similar to a theme of a message collection, comprising one or more previously detected messages including an index message, wherein the message collection and the received message have a similar theme when the messages in the message collection have a common sender or have common content as the received message, and wherein the theme of the message collection is defined by a sender and a modality of the index message that is a first received message at a beginning of a predetermined window of time, and wherein the index message is one of the one or more previously detected messages;
    identifying, with the computing system, a messaging modality associated with each of the messages in the message collection, wherein the messaging modality comprises a mode in which each of the messages in the message collection was sent including one of e-mail, social media, phone call, calendar invitation, text message, Internet service message, microblog message, chat message, or voicemail;
    determining, with the computing system, whether the message collection satisfies modality criteria, wherein the modality criteria specify that at least two different messaging modalities be associated with messages in the message collection, wherein the at least two different messaging modalities comprise two or more of e-mail, social media messaging, phone, calendar invitations, text messaging, Internet service messaging, microblog messaging, chat messaging, and voicemail; and in response to determining that the message collection has a similar theme and determining that the message collection satisfies the modality criteria, notifying the user, with the computing system, of the message collection.

9. The method of claim 8, further comprising:

determining, with the computing system, whether the message has a timestamp falling within the predetermined window of time, wherein a timestamp of the message represents a time at which the message was sent or the message was received;

wherein the message collection comprises only messages timestamped within the predetermined window of time.

10. The method of claim 8, wherein the computing system includes a personal computing device associated with the user and receiving a message addressed to a user comprises receiving, by the personal computing device, a message addressed to a user.

11. The method of claim 8, wherein the computing system includes a server remote from a personal computing device on which the user receives the notification of a plurality of messages.

12. One or more non-transitory computer readable media having instructions thereon that, when executed by one or more processing devices of a computing device, cause the computing device to:

receive a message addressed to a user;

determine whether the received message has a theme that is similar to a theme of a message collection, comprising one or more previously detected messages including an index message wherein the message collection and the received message have a similar theme when the messages in the message collection have a common sender or have common content as the received message, and wherein the theme of the message collection is defined by a sender and a modality of the index message that is a first received message at a beginning of a predetermined window of time;

identify a messaging modality associated with each of the messages in the message collection, wherein the messaging modality comprises a mode in which each of the messages in the message collection was sent including one of e-mail, social media, phone call, calendar invitation, text message, Internet service message, microblog message, chat message, or voicemail;

determine whether the message collection satisfies modality criteria, wherein the modality criteria specify that at least two different messaging modalities be associated with messages in the message collection, wherein the at least two different messaging modalities comprise two or more of e-mail, social media messaging, phone, calendar invitations, text messaging, Internet service messaging, microblog messaging, chat messaging, and voicemail; and in response to a determination that the message collection has a similar theme and a determination that the message collection satisfies the modality criteria, provide a notification of the message collection.

13. The one or more non-transitory computer readable media of claim 12, further comprising instructions thereon that, when executed by the one or more processing devices of the computing device, cause the computing device to:

determine whether the message has a timestamp falling within the predetermined window of time, wherein a timestamp of the message represents a time at which the message was sent or the message was received;

wherein the message collection comprises only messages timestamped within the predetermined window of time.

14. The one or more non-transitory computer readable media of claim 12, wherein the computing device is a personal computing device associated with the user.

15. The one or more non-transitory computer readable media of claim 12, wherein the computing device is a server remote from a personal computing device on which the user receives the notification of a plurality of messages.

16. The one or more non-transitory computer readable media of claim 12, wherein provide a notification of the message collection comprises provide a visual notification on a personal computing device associated with the user, the visual notification indicating that the message collection is available for viewing and information about the message collection, including number of messages, a theme of the message collection, and the modalities associated with messages in the message collection.

17. The one or more non-transitory computer readable media of claim 16, wherein the visual notification is selectable using an input device, and wherein the message collection is displayed in response to selection of the visual notification by the user.

18. The one or more non-transitory computer readable media of claim 12, wherein notification of the user of the message collection occurs prior to any of the messages in the message collection being viewed or listened to.

* * * * *